3,361,818
PROCESS FOR PREPARING AMINATED BENZENES FROM AMINATED CYCLOHEXANES
Robert S. Barker, Port Washington, N.Y., assignor to Halcon International Inc., a corporation of Delaware
Filed Dec. 7, 1966, Ser. No. 599,709
10 Claims. (Cl. 260—578)

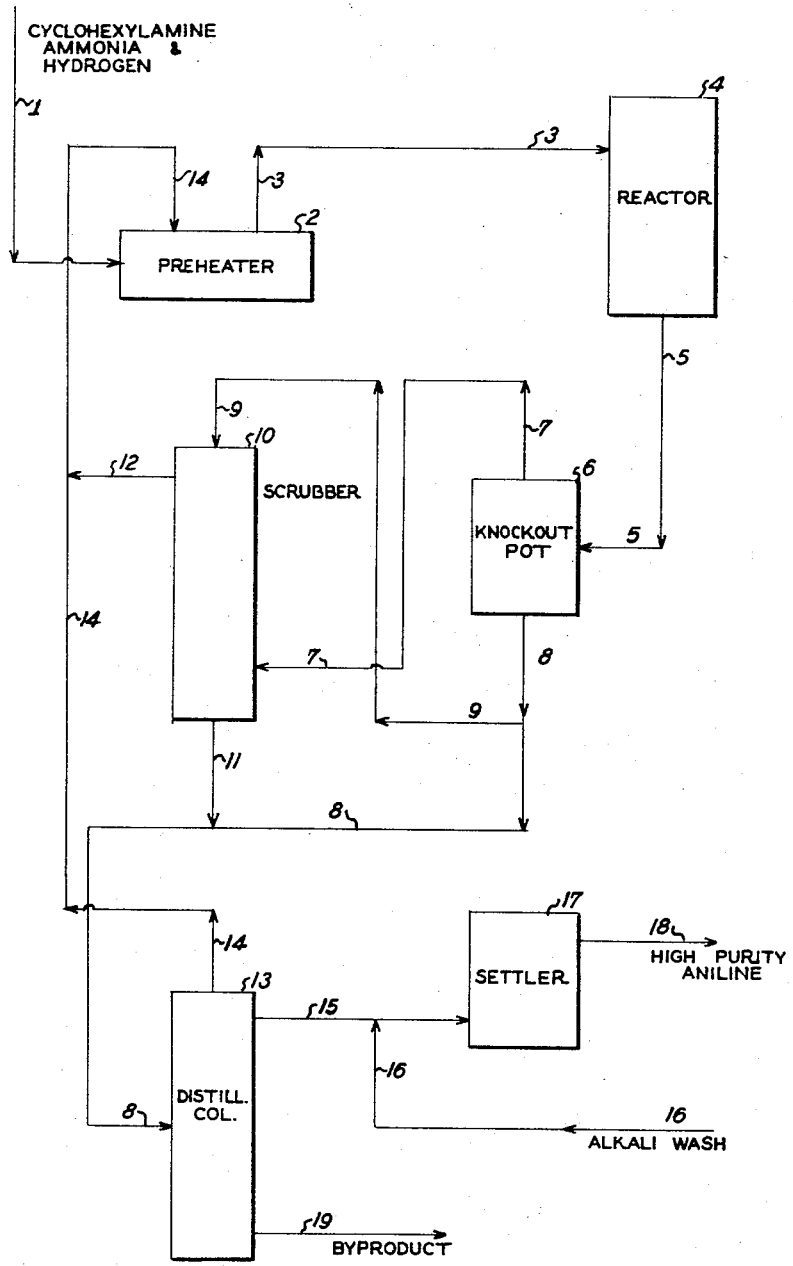

ABSTRACT OF THE DISCLOSURE

This disclosure relates to a process for the preparation of aminated benzenes by dehydrogenating aminated cyclohexanes at temperatures of from about 180° C. to about 500° C. in the presence of a Group VIII metal at a liquid hourly space velocity of from about 0.1 to about 20 hr.$^{-1}$. Yields are improved by conducting the dehydrogenation in the presence of hydrogen, and aminating agent.

Related application

The present application is a continuation-in-part of my copending application, Ser. No. 201,124, filed June 8, 1962, now abandoned.

Background of the invention

Aminated benzenes are commercial chemicals of great industrial importance. For example, the varied uses of the simplest aminated benzene, aniline, include application as a rubber accelerator, antioxidant, dye intermediate, drug intermediate, explosive and fuel. Conventionally, aniline is prepared by the reduction of nitrobenzene with iron filings or borings and 30% hydrochloric acid; by reaction of chlorobenzene with aqueous ammonia at 200° C. and 800 p.s.i.; or by catalytic vapor phase reduction of nitrobenzene with hydrogen.

In the prior art, attempts to convert cycloaliphatic amines to aminated benzenes were unsuccessful. For example, Moss et al., Nature, 178, 1069 (1956) found that benzene rather than aniline was formed by the dehydrogenation of cyclohexylamine.

Objects of the invention

Accordingly, it is an object of the present invention to provide a process for preparing aminated benzenes from aminated cyclohexanes. Another object is to provide effective catalysts for this process. These and other objects of the present invention will become apparent from the following description.

Brief summary of the invention

In accordance with this invention it has been found that aminated benzenes can be prepared from aminated cyclohexanes by treatment at elevated temperatures in the presence of hydrogen and of a group VIII metal at a liquid hourly space velocity of from about 0.1 to about 20 hr.$^{-1}$. Although not essential, an aminating agent and hydrogen are preferably present. This discovery is completely unexpected in view of the prior art which shows, e.g. in the Moss et al. article referred to above, that milder conditions than employed herein result in rupture of the carbon-nitrogen bond with resulting deamination of the cyclo-aliphatic amine as well as dehydrogenation.

Detailed description

The reaction conditions are of particular importance in carrying out the present process. Failure to maintain the proper conditions results in a failure to produce the aminated benzenes and may also result in the destruction of the starting material. The appropriate reaction temperature is broadly between 180° C. and 500° C., preferably 220° C. to 400° C., and most desirably 260° C. to 350° C. The aminated benzene is produced by passing the cycloaliphatic amine over a dehydrogenation catalyst at the foregoing temperatures at a liquid hourly space velocity of from about 0.1 to about 20 hr.$^{-1}$, preferably from about 0.25 to about 8 hr.$^{-1}$, and most preferably from about 1.0 to about 4 hr.$^{-1}$. The presence of hydrogen is not essential for the reaction but helps to maintain catalyst operativeness. Preferably, the molar quantity of hydrogen is at least equal to the molar quantity of cycloaliphatic amine, and more preferably, at least from about 4 to about 7 mols of hydrogen are present per mol of cycloaliphatic amine.

The total pressure of the process can range from subatmospheric to a high as 500 p.s.i.g. In the preferred embodiment, the partial pressures of the cycloaliphatic amine, hydrogen and aminating agent are of particular significance. These partial pressures can be conveniently expressed in terms of mole percent fed into the reactor. The cycloaliphatic amine is preferably present in a concentration of from 0.2 to 50 mole percent, preferably 2 to 25 mole percent. From 1 to 99 mole percent of hydrogen is preferably present, more preferably from 5 to 80 mole percent, and, to achieve superior operation, from 10 to 50 mole percent. The quantity of hydrogen, however, preferably exceeds, on a molar basis, that of the cycloaliphaitc amine. The aminating agent is not necessary but is preferably present in an amount of at least 0.5–1 mole per mole of cycloaliphatic amine. The aminating agent may be conveniently recycled and built up in the reactor without detriment to the process.

By aminated cyclohexanes are meant cyclohexylamine and substituted derivatives thereof. The substituted derivatives may replace a ring hydrogen or a hydrogen attached to the nitrogen atom or both. The substituent may consist of aliphatic or aromatic hydrocarbon groups or both. Examples of these compounds include methylcyclohexylamine, phenylcyclohexylamine, methylphenylcyclohexylamine, tolylaminonaphthylcyclohexane and the like. The aminating agents which are applicable to the instant invention include ammonia and hydrocarbon substituted primary amines. Suitable alkyl amines include methylamine, ethylamine, diethylamine, propylamine, isopropylamine, butylamine, sec-butylamine, t-butylamine, amylamine, 2-ethylhexylamine, octylamine, t-octylamine, sec-octylamine, decylamine, and hexadecylamine. Useful primary aromatic amines are aniline, 2,6-dimethylaniline, o-toluidine, m-toluidine, p-toluidine, p-butylaniline, p-decylaniline, p-dodecylaniline, alpha-naphthylamine, beta-naphthylamine, 2,3-xylidine, mesidine, 2-furanamine, xenylamine, p-phenetidine, p-anisidine, p-butoxylaniline, 3,4-dimethoxylaniline, p-ethylaniline, p-phenoxylaniline, p-cyclohexylaniline, and p-benzylaniline. Preferably, the hydrocarbon radical should contain from 1 to 10 carbon atoms.

The aminated benzenes produced in accordance with the reaction described herein include aniline and substituted anilines. Aniline may be substituted at a hydrogen attached to a ring carbon atom or at a hydrogen attached to the nitrogen atom or both. The substituted group on the ring carbon corresponds to the hydrocarbon radical which is present on the cyclohexylamine precursor, while the hydrocarbon annexed to the nitrogen atom would correspond to the hydrocarbon group of the aminating agent. Aniline, methylaniline, dimethylaniline, carbazole, N-methylaniline, and diphenylamine are a few examples of compounds which may be produced.

The dehydrogenation catalyst is preferably a metal of Group VII of the Periodic Table, or mixtures of two or more such metals, such as metals of the platinum group or the palladium group as well as cobalt and nickel. Copper, iron, molybdenum, chromium or mixtures thereof with each other or any of the foregoing Group VIII metals may be used as promoters for the dehydrogenation catalyst metal. Best yields are obtained using a catalyst supported on neutral materials, such as carbon, silica, silicon carbide, zircon, spinels, or alpha-alumina of the porous type. As used herein, by a neutral support is meant one which either or itself or when neutralized, e.g., by treatment with an acid or a base, will not deaminate the starting material when tested in the absence of catalyst under the reaction conditions. The support may be neutralized at any state in the preparation of the catalyst. It may, for example, be neutralized prior to catalyst impregnation, during catalyst impregnation, or subsequently to catalyst impregnation. Self-supporting catalyst such as the "forminates" may also be employed. These catalysts are described in detail in Groggins, Unit Processes in Organic Synthesis, McGraw-Hill Book Co., Inc. (New York), 1958, edition 5, pp. 434–438.

To further illustrate the invention attention is directed to the attached figure. Cyclohexylamine, ammonia and hydrogen are fed to preheater 2 via line 1. This feed plus the recycle streams, hereinafter described, are preheated to 200° C. and pass to the reactor 4 through line 3. A suitable reactor is an iron pipe, 1″ in diameter and 3′ long. The reactor feed stream in line 3 contains cyclohexylamine, ammonia and hydrogen in a molar ratio of 1:10:10. In reactor 4 the feed passes over a platinum-on-carbon catalyst at a gas space velocity of 2500 hr.$^{-1}$ at 330° C. and atmospheric pressure. The reaction product leaves the reactor 4 through line 5 and passes to knockout pot 6. Hydrogen and ammonia are removed overhead through line 7 and liquid drains out through line 8. A portion of this liquid passes through line 9 to the cooled scrubber wherein the hydrogen and ammonia are stripped of entrained liquid. The scrubber liquid returns via line 9 to line 8 and the scrubbed hydrogen and ammonia recycles via line 12 to preheater 2. The liquid product passes to distillation column 13 at a temperature of 130° C., and the unreacted cyclohexylamine is removed via line 14 and recycled. The second overhead product, at a temperature of 180–185° C., leaves the distillation column 13 through line 15 and is washed with alkali through line 16 to remove trace quantities of phenol. The mixture settles in settler 17 and high purity aniline is removed via line 18. A by-product of the reaction is removed as a bottom product of the distillation column 13 via line 19 and contains primarily dicyclohexylamine, diphenylamine and carbazole.

The following examples, further show the practice of the instant invention:

Example I

Before being placed in the reactor a platinum-on-carbon catalyst is made alkaline by soaking in an excess of dilute 0.05 N NaOH. After washing with water the pH of the resultant catalyst is about 7.5. Prior to the introduction of the feed, the catalyst, after being placed in the reactor, is treated for four hours with a slow stream of $H_2$ at 100–250° C. Cyclohexylamine, ammonia and hydrogen in molar ratio of 1:10:10 are passed over a platinum-on-carbon catalyst at a gas space velocity of 2500 hr.$^{-1}$ and a temperature of 330° C. The liquid effluent from the knock-out pot is analyzed and it is found that 95% of the cyclohexylamine was converted with a selectivity to aniline of 94%. The remainder of the effluent was benzene plus 1% of high-boilers.

Example II

A nickel-copper-chromium catalyst is employed in the reaction under similar conditions to Example I. The selectivity to aniline is 60% and the conversion of cyclohexylamine 75%.

Example III

A palladium catalyst is prepared by treating $PdCl_2$-impregnated zircon with NaOH and hydrazine and process run as in Example I. Methylamine, hydrogen and N-methylcyclohexylamine in a molar ratio of 5:5:1 are passed over the catalyst at 330° C. 60% of N-methylaniline are obtained.

Example IV

Example I is repeated with the use of only one mole of hydrogen per mole of cyclohexylamine. The major component produced is aniline (over 80% yield) with somewhat larger amounts of diphenylamine.

Example V

Example I is repeated except that no hydrogen is present and the temperature is 310° C. The yield of aniline based on cyclohexylamine converted is 70%.

Example VI

Cyclohexylamine is fed to a reactor containing Pt catalyst, as in Example 1, at a temperature of 310–340° C. at a liquid hourly space velocity (LHSV) of 1.0, and at a hydrogen to cyclohexylamine ratio of 7. No aminating agent is used. Conversion of cyclohexylamine is 99.5% and selectivity to aniline is 85%. Benzene and cyclohexane were the other components in the ratio of 8:1.

Example VII

Cyclohexylamine is reacted as in Example VI wherein nitrogen is substituted for hydrogen. A sample collected showed a conversion of cyclohexylamine of 85% with selectivity to aniline of 55%. Remainder of the effluent is a mixture of benzene and high boilers.

It will be understood that modifications and variations may be effected without departing from the spirit of the invention.

What is claimed is:

1. A process for the preparation of aminated benzene compounds which comprises heating an aminated cyclohexane to a temperature of from about 180° C. to about 500° C. in the presence of a dehydrogenation catalyst selected from Group VIII of the Periodic Table, at a liquid hourly space velocity of from about 0.1 to about 20 hrs.$^{-1}$.

2. A process according to claim 1 wherein the heating is carried out in the presence of hydrogen.

3. A process according to claim 2 wherein the molar quantity of hydrogen is at least equal to the molar quantity of aminated cyclohexane.

4. A process according to claim 1 wherein the heating is carried out in the presence of an aminating agent.

5. A process according to claim 4 wherein the quantity of aminating agent is at least 0.5 mole per mole of aminated cyclohexane.

6. A process according to claim 5 wherein hydrogen is present in a molar quantity at least equal to the molar quantity of aminated cyclohexane.

7. A process according to claim 6 wherein the aminating agent is selected from the group consisting of ammonia or hydrocarbon substituted primary amines.

8. A process according to claim 7 wherein the aminating agent is ammonia and the aminated cyclohexane is cyclohexylamine.

9. A process according to claim 6 wherein the temperature is from about 220° C. to about 400° C. and the liquid hourly space velocity is from about 0.25 to about 8 hrs.$^{-1}$.

10. A process according to claim 9 wherein the temperature is from about 260° C. to about 350° C. and the liquid hourly space velocity is from about 1.0 to about 4 hrs.$^{-1}$.

References Cited

UNITED STATES PATENTS 3,272,865   9/1966   Barker _____ 260—578 X

CHARLES B. PARKER, *Primary Examiner.*

P. C. IVES, *Assistant Examiner.*